July 11, 1939.   H. G. HARMAN   2,165,851
LATERAL MOWING APPARATUS
Filed March 14, 1938   4 Sheets-Sheet 4
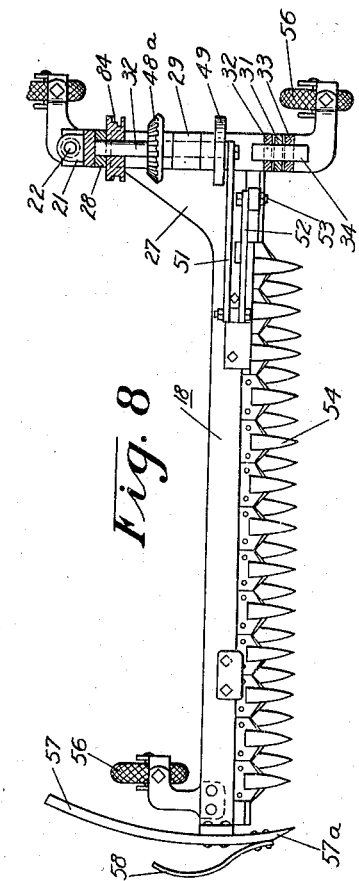
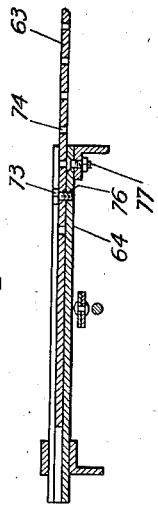
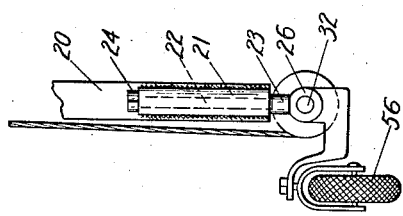
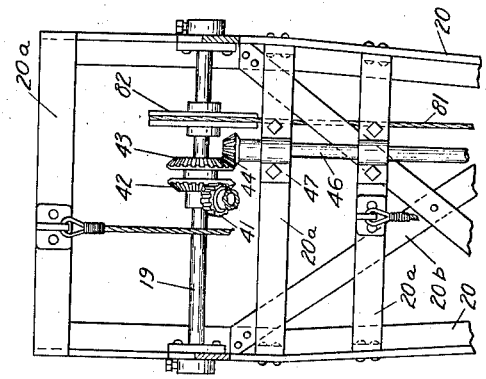
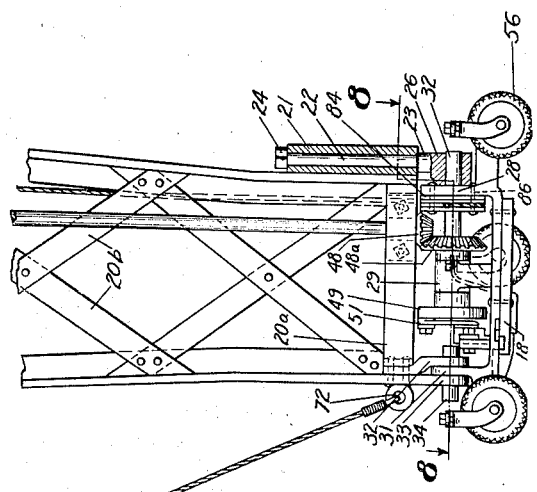
INVENTOR.
HARRY G. HARMAN
BY Flournoy Corey
ATTORNEY.

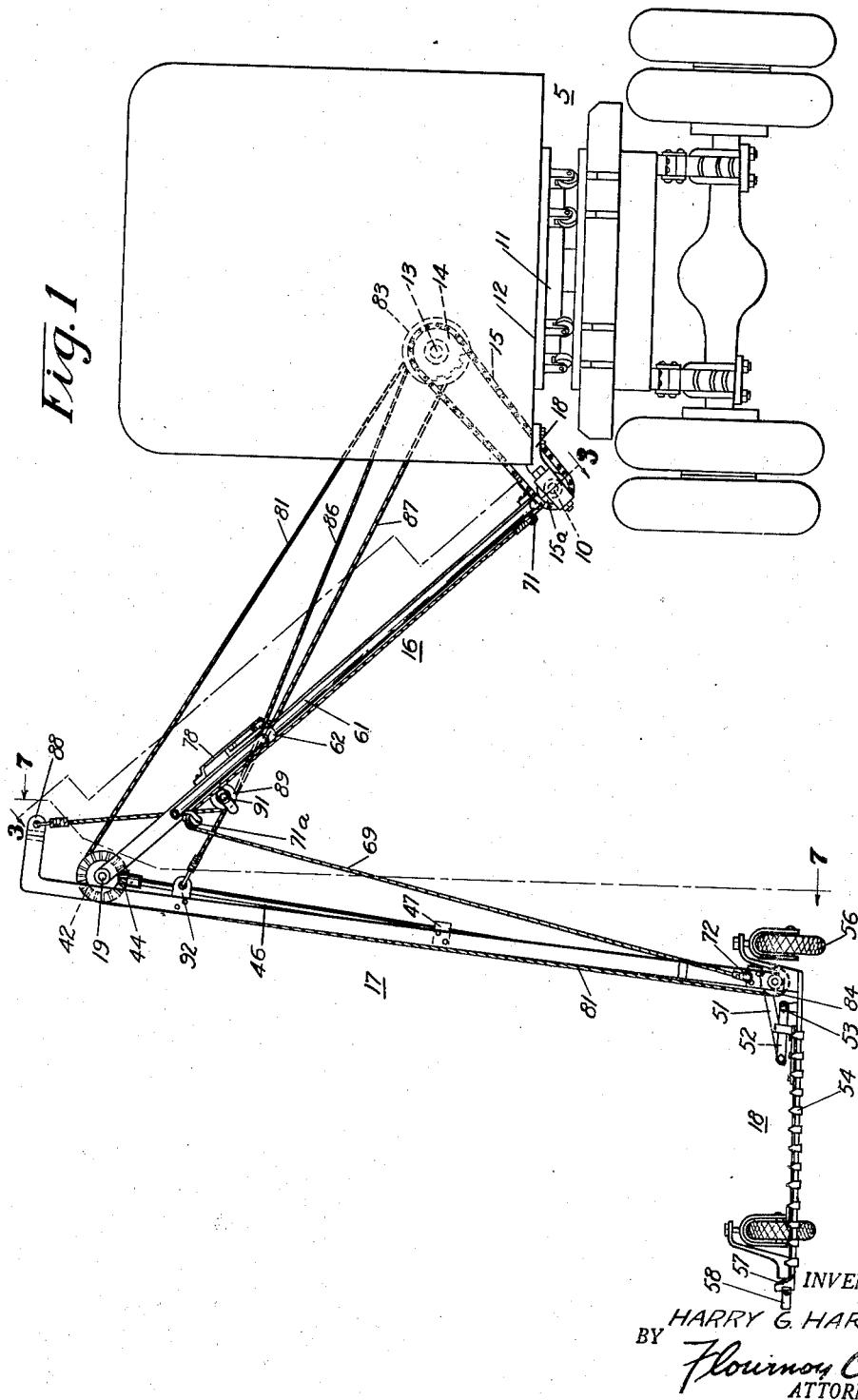

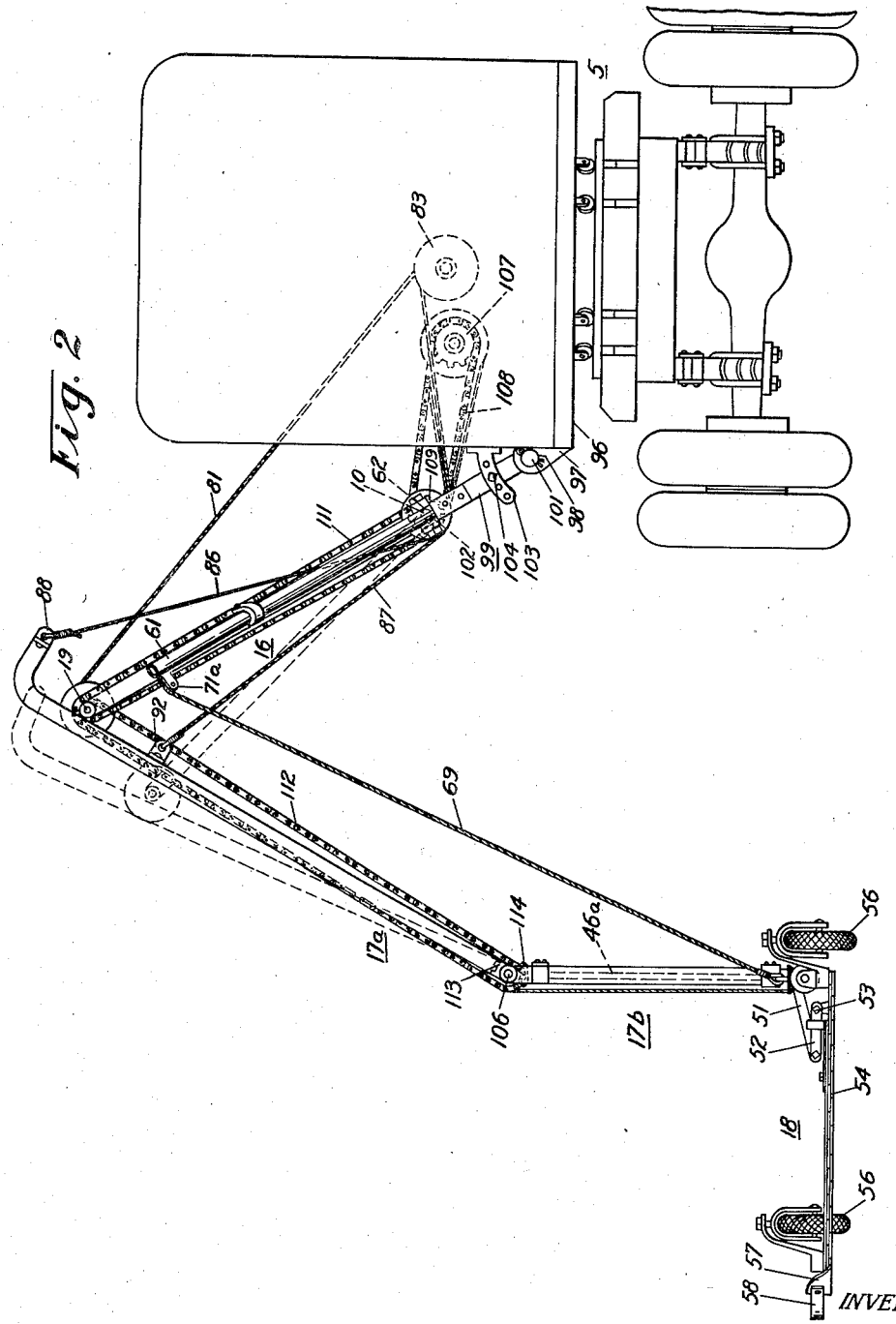

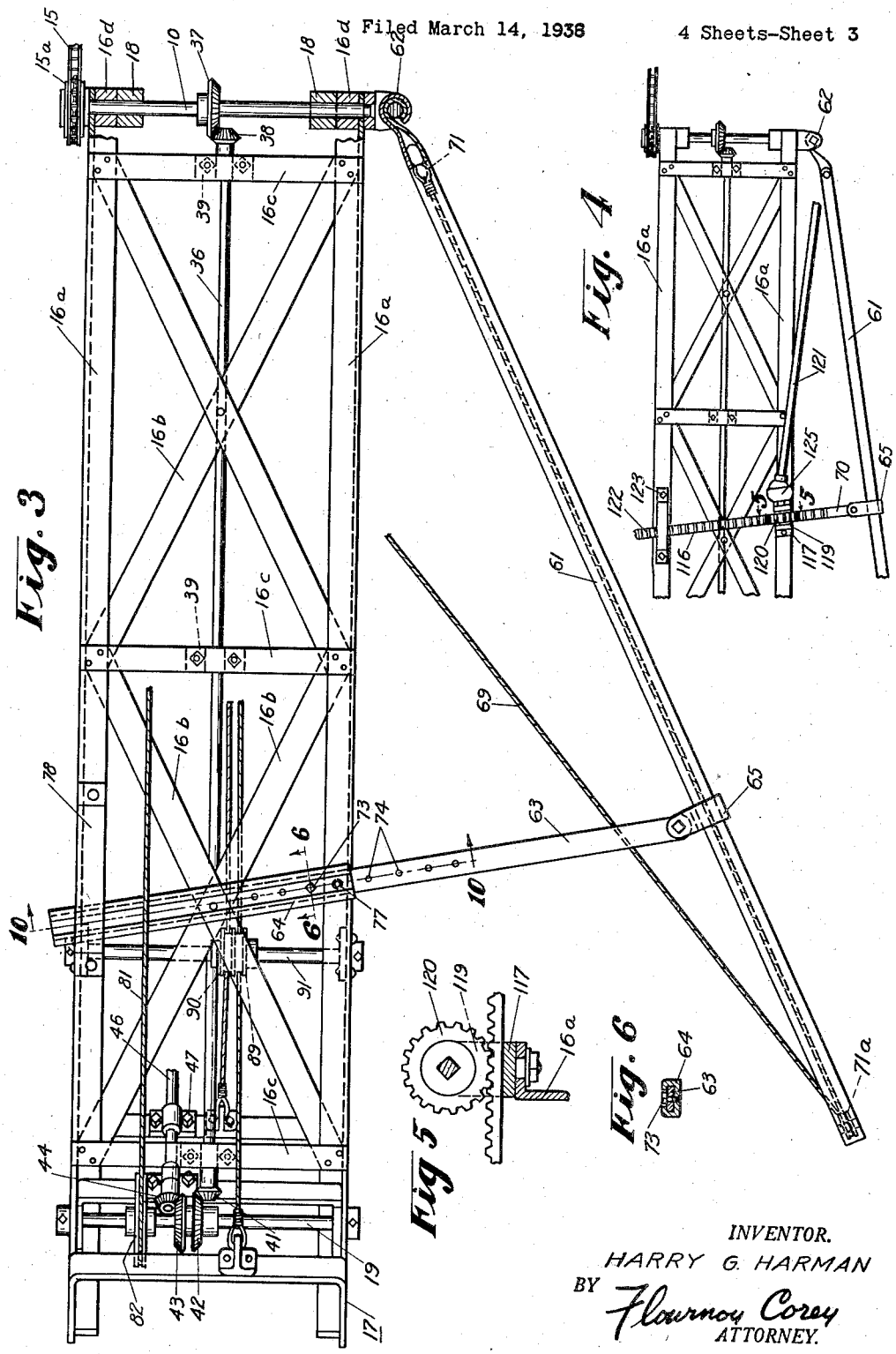

Patented July 11, 1939

2,165,851

UNITED STATES PATENT OFFICE 2,165,851

LATERAL MOWING APPARATUS

Harry G. Harman, Lisbon, Iowa

Application March 14, 1938, Serial No. 195,695

8 Claims. (Cl. 56—25)

This invention relates to mowing apparatus and has particular relation to a means for and method of mowing grass, weeds, and the like at some distance from the mower supporting and driving device, as for instance grass and like vegetation in the ditch beside a highway or railroad right-of-way.

A general object of the invention is to provide means for cutting vegetation which means may be supported in spaced relation from a road or railway vehicle and controlled and driven from the vehicle.

Another object of the invention is to provide means whereby the mowing device may be positioned and driven in any plane and moved up or down or laterally at the will of the operator.

Another object of the invention is to provide a mower and mower controlling and actuating mechanism which may be applied, as an attachment, to the ordinary truck or tractor or to the platform of a plow, shovel, or excavating machine, or devices of like character.

Another object of the invention is to provide means for preventing damage to the mowing apparatus in the event that the mower or other parts of the machine encounter obstructions.

Other and further features and objects of the invention will be more apparent, to those skilled in the art, upon a consideration of the accompanying drawings and following specifications, wherein are disclosed several exemplary embodiments of the invention, with the understanding, however, that such changes may be made therein as fall within the scope of the appended claims, without departing from the spirit of the invention.

In said drawings:

Figure 1 is a view in elevation of a device constructed according to one embodiment of my invention as it appears when mounted upon a turntable on an ordinary truck or tractor.

Figure 2 is a view, also in side elevation, illustrating a device constructed according to another embodiment of my invention as it appears when mounted upon the turntable of a truck-type of excavating device, such as power driven shovel.

Figure 3 is a view in elevation of the inner boom illustrating the structure of the operating parts of the boom and the means for bracing the boom. The view is taken along the lines 3—3 of Figure 1.

Figure 4 is a fragmentary view in elevation of the inner boom illustrating a modified form of bracing means.

Figure 5 is a fragmentary view taken along the line 5—5 of Figure 4.

Figure 6 is a view in section taken along the line 6—6 of Figure 3.

Figure 7 is a view in elevation of the outer boom constructed according to one embodiment of my invention. The view is taken substantially along the line 7—7 of Figure 1.

Figure 8 is a plan view of the cutter bar and a cross section of the portion of the outer boom on which the cutter bar is mounted, the section being taken substantially on the line 8—8 of Figure 7.

Figure 9 is a fragmentary view in front elevation of one of the supporting means of the cutter bar, and Figure 10 is a fragmentary view in section taken along the line 10—10 of Figure 3.

Referring now to the drawings:

The supporting vehicle, indicated generally at 5, may be the ordinary tractor, truck or trailer, or it may be in the form of a flat car or other vehicle if the device is to be used on a railroad. The device may be mounted on a turntable, conventionally indicated at 11, or may be mounted on a stationary platform on the vehicle. The propulsive power of the vehicle may be employed for driving the mowing apparatus or an individual power plant (not shown) may be employed. The power plant may be mounted on the platform 12 of the vehicle. Power for operating the mower is applied to the counter-shaft 13 and, inasmuch as the portion of the device so far described may be conventional, it has been indicated only in a general manner.

Referring now more particularly to Figure 1, a preferred form of the device includes the inner boom 16, the outer boom 17, and the mower head, indicated generally at 18. The outer boom 17 may have a unitary frame, as illusttrated in Figure 1, or may be articulated as indicated generally at 17a and 17b in Figure 2.

The inner boom 16 (Fig. 3) is preferably constructed of standard structural materials as channels at 16a, lattice-like bracing members at 16b, and cross frame members 16c, the boom being pivoted at its lower inner end upon bearings 16d upon shaft 10, which is journalled in a pair of brackets 18 attached to the lower edge of the platform 12.

Attached to boom 16 at its outer end and pivoted about rotating shaft 19 is the upper end of outer boom 17 as illustrated in Figure 7. The outer boom 17 may be constructed in a manner similar to that of the inner boom. It may be built up of structural steel side members 20 tied together by means of cross members 20a and diagonal bracing members 20b.

A mower or cutter head 18 is attached to the lower end of this outer boom 17. The lower end of the outer boom 17 is provided at its rear side with a vertically extending bearing bracket 21 in which a stem 22 is swivelled, said stem having a shoulder 23 at its lower end, a retaining nut 24 at its upper end, and having a transverse journal bearing 26 through its lower end.

The cutter head or bar 18 is provided in its inner end with a widened portion indicated at 27 upstanding from which are three lugs 28, 29 and 31. Aligned bearing surfaces are provided in lugs 28 and 29. Journalled in these bearings is shaft 32 one end of which is also journalled in bearing portion 26 at the bottom of the swivel stem 22. The upstanding lug 31 is held between ears 32 and 33, depending from the forward end of the outer boom 17, by means of a shearable or breakable pin 34 which is inserted through aligned holes in the aforementioned lugs.

The cutter head 18 is swingable vertically against the outer boom 17 about the shaft 32 and pin 34.

Power applied to the countershaft 13 drives sprocket 14. A chain 15 driven by this sprocket in turn drives a sprocket 15a on the shaft 10 which is journalled in the brackets 18, which shaft serves not only as a pivot point for the inner boom 16, but also transmits power to a longitudinal shaft 36 by means of bevel gears indicated at 37 and 38.

Shaft 36, which may be journalled in pillow blocks 39 at several points along its length, is supplied at its upper and outer end with a bevel gear 41 which by means of a bevel gear 42 drives shaft 19. The bevel gear 43, rotating with the driven gear 42, serves in its turn to drive bevel gear 44 mounted on the upper end of shaft 46 which shaft extends the length of the outer boom 20 and is journalled in pillow blocks 47. Attached to the lower end of this shaft 46 is a bevel gear 48 driving a bevel gear 48a upon the shaft 32.

A crank disc 49 which drives the pitman 51 is mounted upon the shaft 32 and adjacent to the bearing in the upstanding lug 29. The outer end of this pitman is pivotally connected to the outer end of a connecting link 52 which link extends back parallel to the pitman and is connected pivotally at point 53 to the inner end of the reciprocating element carrying the cutter blades 54 on the cutter head 18. The cutter head has been represented conventionally and may be of any approved construction.

The cutter head is preferably supplied with castor wheels, as indicated at 56, in order that the cutter head will be maintained in its proper relative position above the ground over which it passes during the mowing operation.

It is also preferable that the outer end of this cutter head be supplied with a swath divider 57, curved longitudinally and having a point 57a at its forward end. It is also preferable that a spring 58 be attached to the outer end of the cutter head, or that other means be provided to deflect any adjacent wire mesh or fence away from the swath divider 57 in order that said swath divider will not become entangled in the fence or the like, and in order that the vegetation may be cut quite close to the fence.

During operation of the mowing machine, considerable strain will be placed upon the several boom members, especially if any obstructions are encountered. Therefore an auxiliary draft 61 is provided which extends along the forward side of the inner boom 16 and which is pivoted at its lower inner end 62 at a point at or near the lower inner end of boom 16, making possible an angular adjustment between the auxiliary boom 61 and the inner boom 16.

The draft boom 61 is held in its desired relative position by means of a bracket 66 clamped about it and pivoted to which is an adjustable strut member 63 which is slidable within a flanged slide-way 64. A section of this member taken at 10—10 in Fig. 10 and a cross section taken on line 6—6 is shown in Figure 6. A cable is attached near the lower end of auxiliary draft boom 61 at a point 71, passed over a pulley 71a, at the outer end of said boom, and the opposite end fastened to the lower outer end of the outer boom 17 at a point 72.

When the cutter head is positioned correctly for operation, the draft boom 61 is moved outwardly from the inner boom 16 until the draft cable 69 is taut. The strut or spacing member 63 is then clamped in position by means of a screw 73, which is inserted through one of a series of holes 74 in the brace 63, and into a threaded hole 76 in the flanged slide-way 64. This slide-way is pivoted at point 77 at one side of inner boom 16, the rearward end of this slide-way 64 being free to move along the side member 16a of the inner boom 16, retained in its proper operating position and guided by means of a member 78.

During operation, the draft boom 61 and cable 69 serve to relieve the inner and outer boom of any undue strain. In case the cutter head 18 meets with any solid obstruction during operation, pin 34 is sheared off or broken, allowing the entire cutter head to rotate about the pivot member 22, thus relieving any strain. Pin 34 may be of wood or any characteristic metal strong enough to carry the load under ordinary use but still easily breakable in case of over load or extreme shock. The inner and outer boom frames 16 and 17 may be moved at the will of the operator to place the cutter head in any position desired by the operator by means including a cable 81. The cable 81 is fastened to the lower end of the outer boom 17, and is passed over a pulley 82 which rotates freely upon the shaft 19. From this point the cable passes over a drum, indicated conventionally at 83, mounted upon the platform 12 and preferably at a point considerably higher than the bracket 18 supporting the lower end of the inner boom.

Rotation of the drum 83 to wind the cable 81 upon it will draw the upper end of both the inner and outer booms inwardly and upwardly, thereby lifting the cutter head off the ground and carrying it against the side of the vehicle.

In order that the cutter head may also be moved upwardly and lie flat against the outer boom, a circular plate or drum 84 is provided, the drum is fastened rigidly to the widened portion 27 of the cutter head by means such as bolts indicated at 86, and in such a position as to be concentric with the shaft 32. The cable 81 is looped under this circular plate or drum and fastened at its inner side. Tension applied on the cable 81 will then rotate the plate 84, lift the outer end of the cutter head and hold it tight against the outer surface of the outer boom, even before the upper ends of the booms are moved inwardly. The cable drum 83 may be hand operated or machine driven.

It is apparent that without additional manipulating means the outer boom 17 will, due to its own weight, tend to remain in vertical position regardless of the position of the inner boom. Therefore, in order to give the machine greater flexibility and enable the operator to better control the lateral motion of the cutter head structure, I have provided auxiliary draft cables 86 and 87, one end of cable 86 being fastened to a laterally extending portion 88 of the upper end of the outer boom 17. This cable passes under a pulley 89, rotating freely on a shaft 91, said shaft being supported from the side members 16a of the inner boom 16. The cable 86 then passes over and around a drum on the operating platform of the vehicle, said drum being similar to drum 83 heretofore described in connection with cable 81. The loose end of the cable may be considered as a new cable 87 which, when looped under a pulley 90 (companion to 89, and rotating freely on the same shaft 91) is then fastened to the outer boom 17 at a point below the shaft 19 and in such a position that the fastening points 88 and 92 are equidistant from the pivoting shaft 19.

Rotation of aforesaid drum lets out one end of the cable and, at the same time, takes in slack at the other end of the cable, thereby swinging the outer boom 17 about its pivot shaft 19. This construction gives the operator a lateral adjustment of the outer boom and tends to stabilize and steady the entire boom arrangement.

The arrangement of the apparatus hereinbefore described is such that mowing operations may be accomplished successfully on relatively level ground or along the sides of cuts and the machine may, by reason of its improved construction, be manipulated so as to straddle mail boxes, guard rails and the like, and to successfully avoid trees, poles and other obstructions.

I have provided, however, a modification of my invention, as illustrated in Figure 2, that will give the machine still greater flexibility and make possible mowing operations on the inner side of roadside ditches, embankments on railway right-of-ways, and against the outer ends of culverts and the like. The arrangement is such that a greater flexibility is allowed in the vertical adjustment of the apparatus. In this modified form of the invention the outer boom structure is made up of two boom members, pivotally connected so as to allow the lower outer boom member to depend vertically from the upper outer boom member while the latter is adjusted by the operator to any position relative to the inner boom member that is necessary to straddle any roadside abutment or obstruction such as guard rails, mail boxes, culverts and the like. Supporting members or brackets on which the inner boom is pivoted may be varied from that illustrated in Figure 1 and heretofore described.

A substantial cross member or sub-frame 96 is provided on or under the carriage, one end of which cross member has upstanding lugs as indicated at 97 with aligned apertures or holes at 98. A stub boom member 99 is provided suitably braced and reinforced to tie this member into a rigid unit, said member 99 being pivoted at its lower end about shaft 101 which is journalled in apertures 98. Member 99 is provided at its upper end with aligned bearing surfaces 102 in which rotating shaft 10 is journalled. The member 99 may be adjusted at any desired angle from the side of the vehicle and held in that position by means of side members 103 and bolts 104.

This construction represents conventionally a means of applying my invention to the carriage or tractor body of the ordinary power shovel and in place of the regular boom. The inner boom 16, which may or may not be foreshortened, is pivoted on shaft 10. At its outer end and pivoted about shaft 19 is the upper and inner end of the outer boom 17a, at the lower end of which is pivoted on shaft 106 an auxiliary boom 17b, the lower end of which acts as a pivot point for the cutter head in a manner similar to that described hereinbefore and illustrated in details in Figures 7, 8 and 9.

Motive power for the cutter head may be supplied by a means similar to that indicated in Figure 1, such as shafts and bevel gears, or as illustrated conventionally in Figure 2. Sprocket 107, driven by the prime mover, drives endless chain 108 to drive a sprocket 109 which is keyed or otherwise fastened to shaft 10. Another sprocket 109a on this shaft drives endless chain 111 which, by means of companion spur gears on shaft 19, endless chain 112, a sprocket 113 fastened on the shaft 106, and bevel gearing indicated generally at 114, drives a shaft 46a in a manner similar to the way shaft 46 is driven as illustrated in Figure 7 and hereinbefore described.

The means and method of giving lateral and vertical motion to the various booms and cutter head by cables is substantially the same as indicated in the description of Figure 1 except that idler pulleys 89 and 91 are placed on the shaft 10 instead of a separate shaft 90. This arrangement of the idler pulleys so as to make them concentric with the pivotal point of the inner boom, and its supporting structure makes lateral motion of this inner boom possible without leaving any slack in the cables 86 or 87.

I have illustrated a further modification that may be made in the manner of taking up slack in the auxiliary draft boom cable. The lower and inner end of said cable, instead of being fastened at a point 71 near the lower end of auxiliary draft boom 61, may be carried around a pulley (not indicated) but nearly concentric with the shaft 10 and carried over and about a drum similar to 83. The rotation of this drum by the operator would serve to take up slack in the cable 69 at the will of the operator and as necessitated by the lateral movement of the various boom members. The construction illustrated in Figure 3 may make it necessary to adjust the angular placement of boom 61 with reference to the inner boom 16 by means of struts or braces 63, but a structure such as I have here proposed would make such adjustment much more convenient.

Another method of accomplishing the adjustment of the draft cable 69 by adjusting the annular relation between draft boom 61 and inner boom 16 is illustrated in Figure 4.

A bracket 65 clamped on the auxiliary draft boom 61 is hingedly connected to a strut member or brace 70 on which is a toothed portion or rach 116. The strut member is slidable longitudinally within a slideway at 117 which is pivotal upon the member 16a of the inner boom frame 16. The detailed sectional view of this drive is shown in Figure 5. A shaft 121 driven or operated from within the cab or from the platform of the vehicle operates through a universal joint indicated at 175 to drive a pinion 120, the shaft supporting this pinion being journalled in a pair of upstanding lugs 119 comprising a part of slideway 117. It is apparent that rotation of the pinion 120 will, through the medium of the rack 116 on the strut 70, operate to vary the angular relation between the auxiliary boom 61 and the inner boom 16 to thus draw the draft cable 69 as taut as necessary.

It is also apparent that any movement of the draft boom 61 will result in the end 122 of the brace or strut 70 travelling in an arc. A strap, or member 123, is therefore provided to guide and retain this loose end of the brace in its proper position.

It will be readily apparent to those versed in the art that numerous changes and modifications may be made in the structure and in the application of the structure to various vehicles which will not in any way depart from the spirit of my invention as defined in the following claims.

1. In a mower, a vehicle, an inner boom pivotally mounted on the vehicle, an outer boom pivotally engaged to the outer end of the inner boom, said outer boom being in two parts hingedly connected to one another, and a mower having a hinged connection with the lower end of the outer boom.

2. In a mowing apparatus, an inner boom member pivotally mounted at its lower end, a support member connecting said boom member with the body of a supporting vehicle, an outer boom member pivotally attached at its upper end to the outer upper end of the inner boom member, a cutter head member pivotally mounted at its inner end to the lower end of the outer boom member, means for supporting said cutter head in spaced relation with the ground over which it passes, means for driving the reciprocating cutter blade in the cutter head from a prime mover mounted upon the carriage of the supporting vehicle, means for controlling the vertical and lateral movement of the various boom members and the cutter head, means for maintaining any desired angular relation between various booms and members, and means for bracing the outer boom members to relieve them from undue strain and shock.

3. In a mowing apparatus for use on a power vehicle, having a carriage mounted upon said vehicle, an upwardly extending inner boom member hingedly connected at its lower inner end to said carriage, an outer boom member hingedly connected at its upper inner end to the upper outer end of the inner boom, a cutter head hingedly attached at its inner end to the lower end of the outer boom, drive shaft members and bevel gearing, spur gears and endless chain so disposed as to drive the reciprocating cutter blade of cutter head by power supplied from within the supporting vehicle, a means for varying the vertical and lateral motion of the boom members and the cutter head, an auxiliary draft boom member extending forwardly of the inner boom member, a draft cable extending from the outer end of the said draft boom and attached to the lower end of the outer boom member, and a means for taking up slack in said draft cable.

4. In a mowing apparatus, a vehicle, a carriage mounted upon said vehicle, an inner boom member hingedly mounted on the lower edge of said carriage, an outer boom member hingedly mounted at its upper end to the upper end of the inner boom member, a supplementary outer boom member hingedly attached at its upper end to the lower end of the main outer boom member, a cutter head hingedly mounted at its inner end to the lower end of the auxiliary boom member, castor wheels to support same in spaced relationship with the surface over which it must pass, means of varying the spaced relationship between the various members, means to control lateral and vertical motion of the cutter head, an auxiliary draft boom, a draft cable extending from the outer end thereof, and attached to the lower end of the supplementary outer draft boom to relieve boom members of the strain occurred during operation, and a means of driving the reciprocating cutter blade in the cutter head remotely from power supplied within the supporting vehicle.

5. In a mowing apparatus, a carriage, an upwardly extending inner boom hingedly connected at its lower end to the carriage, an outer boom member hingedly connected at its upper end to the upper end of the inner boom, a cutter head hingedly connected at its inner end to the lower end of the outer boom member, a circular member fastened to the cutter head and concentric with the pivotal point of the cutter head, a cable fastened to the side of the circular member nearest the carriage and wrapped down and about the circular member, up and over a free running pulley placed at the pivot point of the inner and outer booms and a means mounted upon the carriage for drawing in or letting out said cable.

6. In a mowing apparatus, a member fastened rigidly to an outer boom member, a vertical bearing portion within said member, a rotatable member journalled within said bearing, spacing and retaining shoulders at bottom and top of said member, a laterally extending bearing surface within the lower end of said rotatable member, a cutter head having a widened portion at its inner end, three upstanding lugs from the widened portion of the cutter head having aligned bearing openings therein, rotatable shaft journalled in two of the three mentioned bearings and in the lower end of the vertically extending rotating member first mentioned, two ears depending from the side of the outer boom opposite the upwardly extending bearing surface first mentioned said ears having aligned bearing portions therein, said lugs to straddle the third lug upstanding from the widened portion of the mower head, and a shearable pin journalled within the aligned bearing surfaces of the two depending lugs and the one upstanding lug.

7. In a mowing apparatus, a carriage, an inner boom frame pivotally mounted at its lower end to the carriage, an outer boom frame pivotally mounted at its upper end to the upper end of the inner boom frame, a cutter head pivotally mounted at its inner end to the lower end of the outer boom frame, an auxiliary draft boom pivotally mounted at its lower inner end at a point near the inner end of the inner boom, a cable fastened at one end at a point near the pivotal point of the draft boom, a pulley at the outer end of said draft boom over which aforesaid cable extends and connects with the lower end of the outer boom member, a laterally adjustable strut member pivoted to the draft boom and extending past inner boom member, a flanged slideway pivoted to the inner boom member, in which slideway the adjustable strut is slideable, a series of openings the length of the strut, one threaded opening in the flanged slideway aligned with the series of holes in the strut, a bolt to fit through any one of the series of holes in the strut into the threaded portion of the aligned hole in the slideway, and a strap to retain and guide the free end of the flanged slideway.

8. In a mowing apparatus having, a carriage, an inner boom hinged thereto at its lower inner end, an outer boom hingedly connected at its upper end to the upper outer end of the inner boom, and a cutter head hingedly connected at its inner end to the lower end of the outer boom, an auxiliary draft boom, a means for attaching same at its inner end at a point near the inner end of the inner boom member, a pulley at the outer end of said auxiliary draft boom, a cable fastened to the lower end of the outer boom member and passing over the pulley at the end of the auxiliary draft boom, the inner end of said cable being fastened at a point near the pivotal point of the draft boom, a strut member hingedly attached at a point on the auxiliary draft boom, said strut having a toothed portion or rack thereon, a spur gear engaging with the rack, a slideway pivoted upon the side member of the inner boom and in which the strut member slides, a pair of ears upstanding from this slideway, having aligned bearing portions therein, a shaft carrying the spur gear and journalled in these bearings, a universal joint attached to said shaft, a drive shaft connected to the universal joint and extending onto the carriage of the supporting vehicle, a means for revolving and locking the shaft at any point, and a guide member, at the end of the strut opposite the pivotal point, to guide and retain the strut in its proper position.

HARRY G. HARMAN.